United States Patent [19]

Maldavs

[11] Patent Number: 4,481,977
[45] Date of Patent: Nov. 13, 1984

[54] DUST CAP FOR FLUID COUPLING

[75] Inventor: Ojars Maldavs, Lincoln, Nebr.

[73] Assignee: Imperial Clevite Inc., Glenview, Ill.

[21] Appl. No.: 514,526

[22] Filed: Jul. 18, 1983

[51] Int. Cl.³ ............................................. F16L 55/00
[52] U.S. Cl. .................................. 138/89.4; 141/326;
  141/350; 220/229; 220/254; 220/361
[58] Field of Search ....................... 141/125, 350, 326;
  138/89, 89.1, 89.2, 89.3, 89.4; 383/43, 903;
  150/37; 215/317; 220/229, 254, 361, 373;
  229/75

[56] References Cited

U.S. PATENT DOCUMENTS

| | | | |
|---|---|---|---|
| 317,794 | 5/1885 | Jackson | 285/45 |
| 1,944,621 | 1/1934 | Aha | 383/903 |
| 2,667,906 | 2/1954 | Stiller | 150/37 |
| 3,063,487 | 11/1962 | Mullin | 150/37 |
| 4,037,754 | 7/1977 | Wilhelmi et al. | 220/361 |

*Primary Examiner*—John W. Shepperd
*Attorney, Agent, or Firm*—Russell E. Baumann

[57] ABSTRACT

A dust cap for a fluid coupling includes a generally cylindrical body which is mounted on the coupling and an end wall at one end of the cylindrical body. The end wall is provided with a slit therein for permitting another coupling to be inserted through the end wall and a stress relief opening at each end of the slit. A flexible and resilient flap covers each of the stress relief openings, and a fluid drain port is provided in the cylindrical body.

8 Claims, 9 Drawing Figures

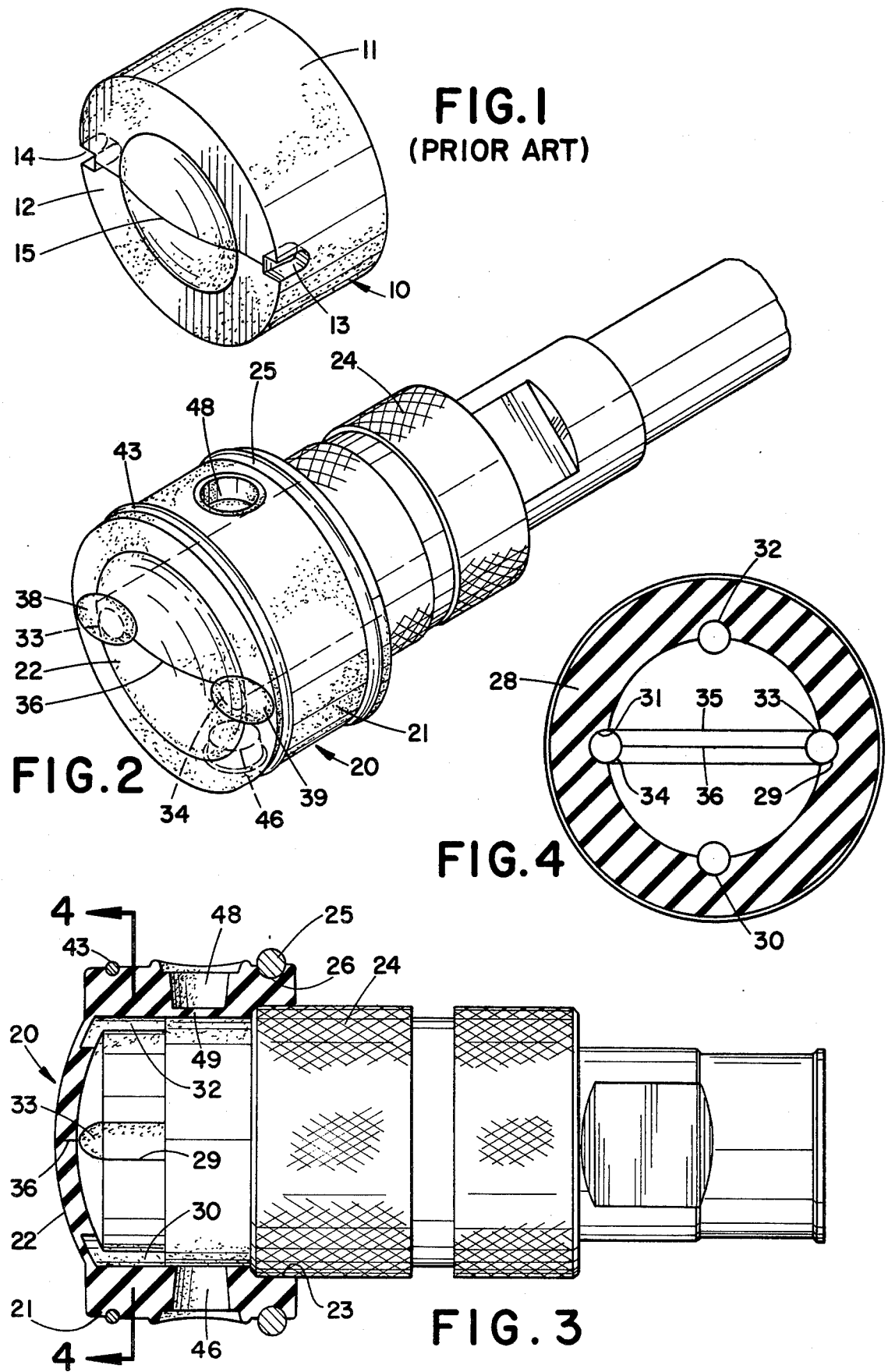

DUST CAP FOR FLUID COUPLING

BACKGROUND AND SUMMARY

This invention relates to a dust cap for a fluid coupling, and, more particularly, to a dust cap for a quick disconnect coupling which prevents contamination from entering the coupling when the coupling is connected to another coupling or disconnected and which collects fluid spillage during uncoupling.

Quick disconnect couplings are used, for example, to connect hydraulic fluid line hoses. When the male and female couplings on the ends of a pair of hoses are connected, fluid can flow through the hoses. When the couplings are disconnected, valves within the couplings close and prevent fluid from escaping.

Quick disconnect couplings are so named because the male and female couplings can be quickly connected and disconnected by simple pushing and pulling forces. Such couplings are commonly used, for example, on agricultural tractors for connecting the tractor hydraulic system with the attachable implements.

Quick disconnect couplings are typically located where harmful contamination can enter the hydraulic system and cause damage to system components. When the coupling is disconnected, contamination collects on the oily interfaces. When the coupling is reconnected, the contamination is ingested into the hydraulic system. In dusty environments, such as farming and construction sites, contamination sifts into the parts of the coupling sliding surface and the locking mechanism and can cause malfunction.

Typical protective devices which have been used on quick disconnect couplings are slip-on or snap-on caps and plugs to protect the uncoupled coupling half. However, operators frequently fail to install the caps and plugs, and contamination enters. Also, traditional caps and plugs become oily and collect dust and dirt. Then, when the operator install the cap or plug, it ingests contamination into the coupling halves and into the system.

The inventive cap is attached to the female half of the coupling and automatically closes and seals the uncoupled female half. When a male half is connected to the female half, the male half is inserted through a slit in the cap. The cap wires the male half clean as it is inserted, and the cap seals around the male half to prevent contamination from entering. The cap is provided with a stress relief opening at each end of the slit, and the stress relief openings are covered by flexible and resilient flaps which also assist in wiping the male half during insertion. The cap is provided with a drain port to allow collecting and remote draining of oil which is normally spilled during the disconnecting cycle.

DESCRIPTION OF THE DRAWINGS

The invention will be explained in conjunction with an illustrative embodiment shown in the accompanying drawings, in which—

FIG. 1 is a perspective view of a prior art dust cap;

FIG. 2 is a perspective view of a dust cap formed in accordance with the invention mounted on the female half of a quick disconnect coupling;

FIG. 3 is a sectional view taken through the dust cap and female half shown in FIG. 2;

FIG. 4 is a sectional view taken along the line 4—4 of FIG. 3;

DESCRIPTION OF SPECIFIC EMBODIMENTS

Figure 5:
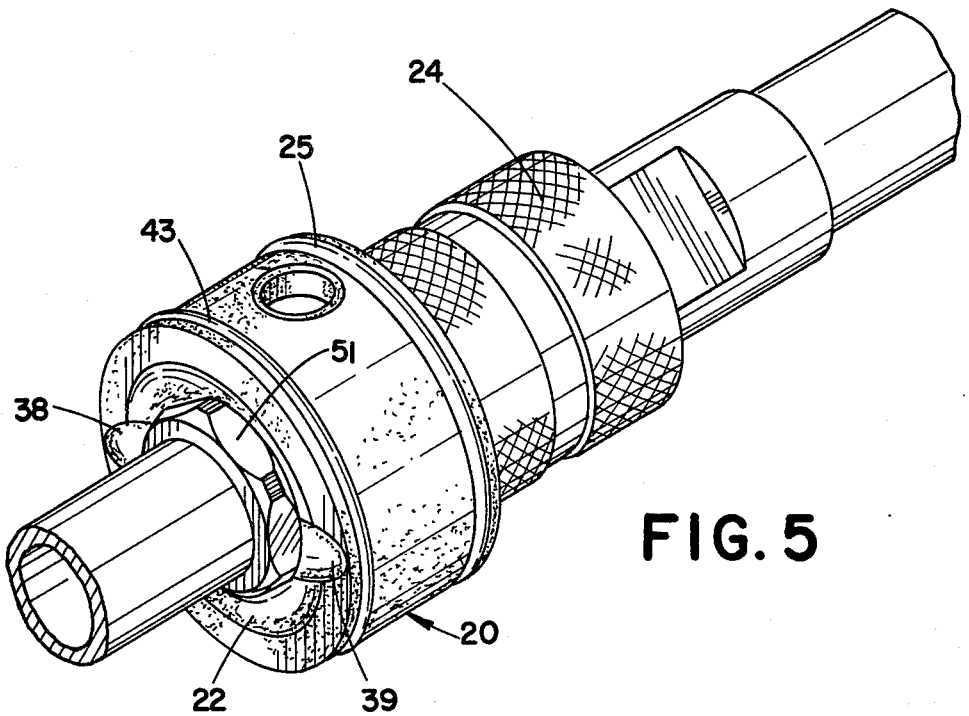
FIG. 5 is a perspective view similar to FIG. 2 showing the male half of the quick disconnect coupling inserted through the dust cap and coupled to the female half.

Referring first to FIG. 1, a prior art dust cap 10 includes a cylindrical body 11 and an end wall 12 which closes one end of the cylindrical body. The cylindrical body is adapted to be mounted on the end of the female half of a quick disconnect coupling. A pair of diametrically opposed notches 13 and 14 are provided in the dust cap, and a slit 15 extends through the end wall 12 between the two notches.

The male half of the quick disconnect coupling can be connected to the female half by inserting the male half through the slit 15 in the dust cap. The notches 13 and 14 are stress relief notches for relieving stress at the ends of the slit when the male half is inserted.

Referring now to FIGS. 3 and 4, a dust cap 20 formed in accordance with the invention also includes a cylindrical body 21 and an end wall 22 which closes one end of the cylindrical body. The open end of the cylindrical body is provided with a radially enlarged recess 23 which is inserted over the end of the female half 24 of a conventional quick disconnect coupling. Typical quick disconnect couplings are described, for example, in U.S. Pat. Nos. 4,240,466 and 4,221,435. The dust cap is clamped in the female half by a metal clamping ring 25 which is inserted in a groove 26.

Figure 7:
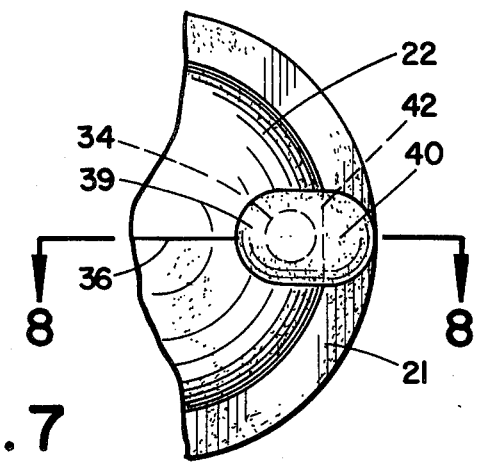
FIG. 7 is a fragmentary front elevational view of the dust cap showing one of the flaps covering a stress relief opening.

The end wall 22 is dome-shaped and is thinner in cross section than the wall of the cylindrical body 21 (see FIG. 3). The cylindrical body includes a thicker end portion 28 adjacent the end wall, and the thicker end portion 28 is provided with four axially extending recesses 29, 30, 31, and 32 (FIG. 4). The end wall 22 is provided with two openings 33 and 34 (see particularly FIGS. 7 and 8) which are formed as extensions of the grooves 29 and 31. A recess 35 (FIGS. 4 and 8) is provided in the rear surface of the end wall between the openings 33 and 34, and a slit 36 in the recess 35 extends through the end wall between the openings 33 and 34.

A pair of flexible and resilient flaps 38 and 39 are attached to the dust cap and cover the openings 33 and 34 in the end wall. Each of the flaps has an elongated oval shape and includes an attaching portion 40 (FIG. 7) which is secured to the end of the cylindrical body and a covering portion 41 which extends over and covers the opening in the end wall. In the embodiment illustrated, the attaching portion 40 of each flap is attached to the cylindrical body along a line 42 (FIG. 7), and the remainder of the flap radially inwardly of the line 42 is free to flex as the male coupling is inserted through the dust cap as will be described hereinafter.

A solid metal support or reinforcing ring 43 extends around the dust cap adjacent the end wall 22. The support ring is positioned within an annular recess in the outer surface of the cylindrical body 21 and maintains the circular configuration of the cylindrical body when the male coupling is inserted.

Figure 6:
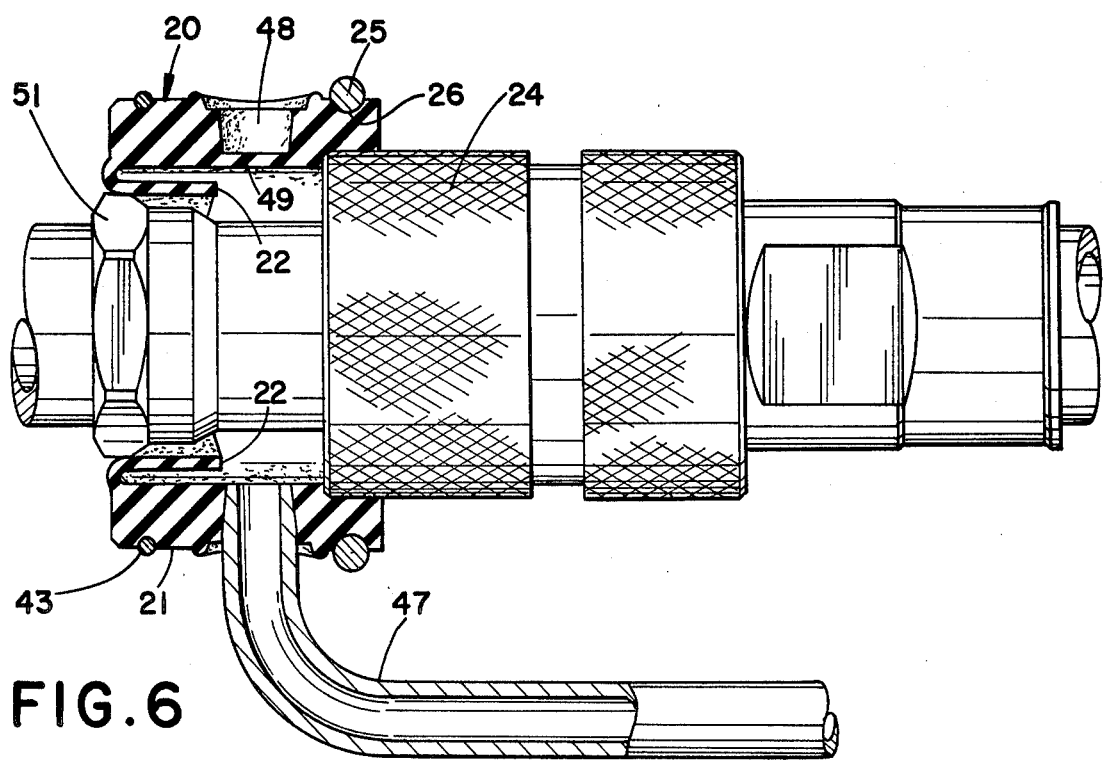
FIG. 6 is a sectional view taken through the coupled male and female halves shown in FIG. 5 and also showing a remote drain line.

A drain port 46 (FIG. 3) extends through the bottom of the cylindrical body for attaching an oil drain hose or tube 47 shown in FIG. 6. Oil which is normally spilled when the male and female halves of the coupling are disconnected is collected by the dust cap and drained through the drain port 46 and drain tube 47 to a remote collecting point.

An optional drain port 48 is provided in the top of the cylindrical body. The drain port 48 is closed by a membrane 49 which is a continuation of the inside wall of the cylindrical body 21, and the drain port 48 can be opened by cutting away the membrane 49. The drain port 48 is used when two couplings are stack mounted. The top dust cap drains through its bottom drain port 46 into the top drain port 48 of the lower dust cap and then through the bottom drain port 46 of the lower dust cap.

The dust cap is advantageously molded from elastomeric material such as rubber or synthetic rubber, and the slit end wall 22 is flexible and resilient. A conventional male half 51 (FIGS. 5 and 6) of the quick disconnect coupling is coupled to the female half 24 by inserting the male half through the slit 36 in the end wall of the dust cap. The two halves of the slit end wall flex and separate as the male half is inserted, and the wiping action of the end wall against the male half cleans dirt and other contamination from the male half.

After the male half is inserted through the end wall of the dust cap, it is connected to the female half in the conventional manner. The flexible and resilient halves of the end wall press against the male coupling (FIG. 6) and prevent contamination from sifting into the dust cap.

The openings 33 and 34 in the end wall at the ends of the slit 36 are stress relief openings which relieve stress at the ends of the slit as the male half is inserted. The flaps 38 and 39 not only cover these openings before the male coupling is inserted but also provide wiping action on the sides of the male half and help maintain a seal against the male half. As can be seen in FIG. 5, the ends of the flaps 38 and 39 are drawn inwardly by the male half and provide a seal at the ends of the slit in the end wall.

When the male half is uncoupled from the female half and withdrawn from the dust cap, the flexible and resilient end wall 22 and the flaps 38 and 39 return to their original position shown in FIGS. 2 and 3. The interior of the dust cap and the female half are thereby maintained free of contamination.

Figure 8:
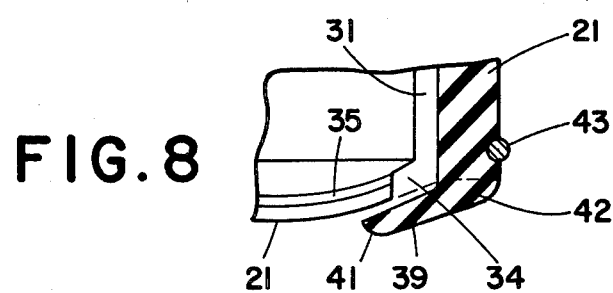
FIG. 8 is a sectional view taken along the line 8—8 of FIG. 7.

Although the flaps 38 and 39 can be attached to the dust cap by a suitable adhesive or the like, the preferred method of forming the flaps is to mold them integrally with the end wall and cylindrical body and thereafter slit the flaps away from the end wall to provide the detached covering portions 41. Referring to FIGS. 2-4, the dust cap is molded from elastomeric material such as rubber or synthetic rubber. The dust cap is molded without the slit 36 or the through openings 33 and 34. Instead, the flaps 38 and 39 are molded as outwardly extending projections on the end wall 22, and the openings 33 and 34 are merely recesses which are molded into the dust cap and which extend forwardly from the grooves 29 and 31 in the inside surface of the cylindrical body 21. The recesses 33 and 34 extend through the thickness of the end wall but not through the projections which form the flaps 38 and 39. Thereafter, the inward ends of the flaps 38 and 39 are cut or slit away from the end wall 22 so that the recesses 33 and 34 extend completely through the end wall as illustrated in FIG. 8. The slit between each flap and the end wall extends to the line 42 illustrated in FIG. 7.

The recess 35 (FIGS. 4 and 8) in the inside surface of the end wall 22 is formed during the molding operation. After the ends of the flaps 38 and 39 are cut away from the end wall, the slit 36 is made in the end wall between the openings 33 and 34.

Figure 9:
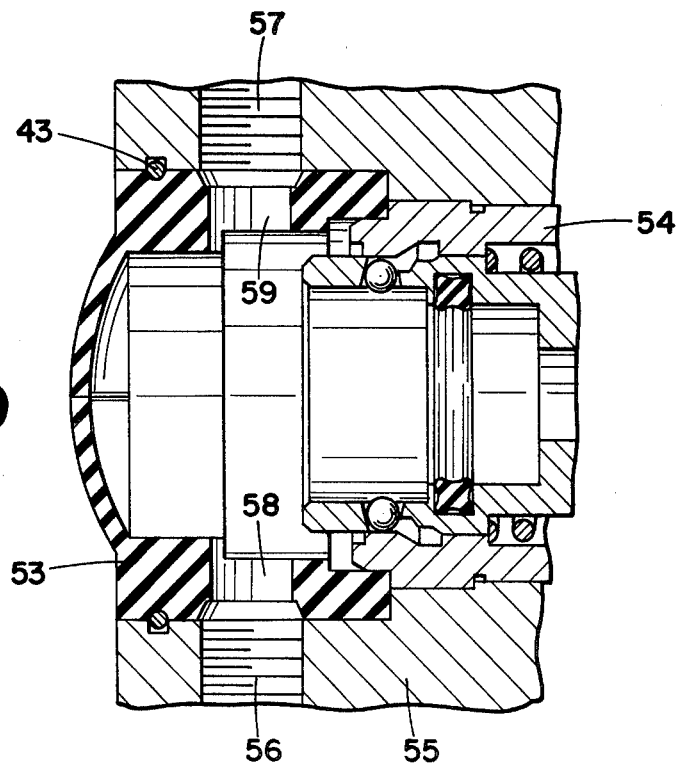
FIG. 9 is a sectional view of another embodiment of a dust cap mounted within a housing which surrounds the female half.

FIG. 9 illustrates an alternate embodiment of the invention. A dust cap 53 is retained on a female half 54 of a quick disconnect coupling by a housing 55 rather than by the metal clamping ring 25 shown in FIG. 3. The dust cap 53 is otherwise formed in the same manner as the dust cap 20.

The housing 55 supports both the dust cap 53 and the female half 54. A pair of drain ports 56 and 57 in the housing are aligned with drain ports 58 and 59 in the dust cap.

While in the foregoing specification a detailed description of specific embodiments of the invention were set forth for the purpose of illustration, it will be understood that many of the details herein given may be varied considerably by those skilled in the art without departing from the spirit and scope of the invention.

I claim:

1. A dust cap for a coupling comprising a generally cylindrical body adapted to be mounted on the coupling, an end wall at one end of the cylindrical body, the end wall having a slit therein for permitting another coupling to be inserted through the end-wall and a stress relief opening at each end of the slot, and a flap covering each of the stress relief openings which is flexible and resilient and adapted to sealingly engage a coupling which is inserted through the end wall.

2. The dust cap of claim 1 in which the cylindrical body is provided with a drain port therethrough.

3. The dust cap of claim 1 in which the cylindrical body is provided with a pair of generally diametrically opposed drain ports therethrough.

4. The dust cap of claim 1 including a reinforcing means surrounding the cylindrical body adjacent the end wall.

5. The dust cap of claim 1 in which the cylindrical body is provided with an annular groove in the outer wall thereof adjacent the end wall, and a reinforcing metal ring positioned in the annular groove.

6. The dust cap of claim 1 including a clamping means surrounding the cylindrical body adjacent the end opposite said one end for clamping the cylindrical body to the coupling.

7. The coupling of claim 1 in which each of said flaps includes a first end which is attached to the end wall radially outwardly of the associated stress relief opening and a second end which extends radially inwardly to cover the stress relief opening.

8. The dust cap of claim 1 in which the dust cap is molded from elastomeric material and the flaps are molded integrally with the end wall.

* * * * *